United States Patent
Jreij et al.

(10) Patent No.: US 12,293,228 B2
(45) Date of Patent: May 6, 2025

(54) SYSTEMS AND METHODS FOR MEASURING HARDWARE UTILIZATION

(71) Applicant: Dell Products L.P., Round Rock, TX (US)

(72) Inventors: Elie Antoun Jreij, Pflugerville, TX (US); Austin Patrick Bolen, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 406 days.

(21) Appl. No.: 17/959,501

(22) Filed: Oct. 4, 2022

(65) Prior Publication Data
US 2024/0111583 A1    Apr. 4, 2024

(51) Int. Cl.
*G06F 9/50* (2006.01)
*G06F 9/4401* (2018.01)

(52) U.S. Cl.
CPC .......... *G06F 9/5016* (2013.01); *G06F 9/4406* (2013.01)

(58) Field of Classification Search
CPC .............................. G06F 9/5016; G06F 9/4406
See application file for complete search history.

(56) References Cited

U.S. PATENT DOCUMENTS

| | | | | |
|---|---|---|---|---|
| 7,877,788 B1* | 1/2011 | Topp | ...................... | G06F 21/44 726/17 |
| 9,576,270 B1* | 2/2017 | Afshar | .................. | H04L 51/214 |
| 10,242,176 B1* | 3/2019 | Sathyanarayana | ...... | G06F 13/36 |
| 10,832,361 B2 | 11/2020 | Mowatt et al. | | |
| 10,848,972 B2* | 11/2020 | Veramendi | ................ | G06F 3/01 |
| 11,403,384 B2* | 8/2022 | Dreger | .................. | G06F 1/3231 |
| 12,099,850 B2* | 9/2024 | Jreij | ...................... | G06F 9/4406 |
| 2009/0172770 A1 | 7/2009 | Sandage et al. | | |
| 2014/0351654 A1 | 11/2014 | Zhang et al. | | |
| 2017/0094133 A1* | 3/2017 | Hamsici | ................ | G06F 16/532 |
| 2018/0285967 A1 | 10/2018 | Gilbey et al. | | |
| 2018/0349314 A1 | 12/2018 | Angus et al. | | |
| 2019/0281449 A1 | 9/2019 | Luo | | |
| 2019/0352933 A1* | 11/2019 | Tartal | ...................... | E05B 65/02 |
| 2022/0020082 A1 | 1/2022 | Kataoka et al. | | |
| 2022/0027522 A1* | 1/2022 | Kasheshian | ............. | G06F 21/83 |
| 2022/0124118 A1 | 4/2022 | Bangalore Sathyanarayana | | |
| 2022/0219564 A1 | 7/2022 | Aoto et al. | | |

(Continued)

OTHER PUBLICATIONS

Bolen, Austin et al., PCIe Hot-Plug and Error Handling for NVMe, PCIe Hot-Plug and Error Handling for NVMe, Mar. 19, 2019, nvm Express (25 pages).

(Continued)

*Primary Examiner* — Henry Tsai
*Assistant Examiner* — Christopher A Daley
(74) *Attorney, Agent, or Firm* — Chamberlain, Hrdlicka, White, Williams & Aughtry; Aly Z. Dossa

(57) ABSTRACT

A node comprising, a processor executing a first operating system, a peripheral port connected to a peripheral device, a system control processor executing a second operating system, where the system control processor is configured to perform a method for metering usage of the peripheral device by the first operating system, the method that includes obtaining utilization data from a peripheral device, and sending the utilization data to a remote authentication server, where the first operating system cannot access the system control processor.

20 Claims, 8 Drawing Sheets

(56) References Cited

U.S. PATENT DOCUMENTS

2022/0256306 A1* 8/2022 Perraud ............ G08G 1/096741
2023/0237185 A1* 7/2023 Kumar .................. G06F 13/102
726/21

OTHER PUBLICATIONS

Austin Bolen et al., "PCIe Hot-Plug and Error Handling for NVMe" 2019 NVMe™ Annual Members Meeting and Developer Day, NVM Express. (Mar. 19, 2019) (25 pages).

* cited by examiner

| Peripheral Database 632 | | | | | |
|---|---|---|---|---|---|
| | Peripheral Port Identifiers 636 | Peripheral Device Identifiers 638 | Utilization Data 640 | Constraint Data 642 | Access Statuses 644 |
| Peripheral Entry A 634A | 1 | WD795135 | 16.3 hours | 20 hours | Allow |
| Peripheral Entry B 634B | P2-3 | NVDAGX800 | $15,678 | $10,000 | Limited |
| Peripheral Entry C 634C | JPS1204 | S2-8NVD | 6 giga-IOs | 6 giga-IOs | Deny |

FIG. 6

SYSTEMS AND METHODS FOR MEASURING HARDWARE UTILIZATION

BACKGROUND

Devices and/or components of devices are often capable of performing certain functionalities that other devices and/or components are not configured to perform and/or are not capable of performing. In such scenarios, it may be desirable to adapt one or more systems to enhance the functionalities of devices and/or components that cannot perform the one or more functionalities.

BRIEF DESCRIPTION OF DRAWINGS

FIG. 6 shows an example of a peripheral database, in accordance with one or more embodiments.

DETAILED DESCRIPTION

Figure 1:
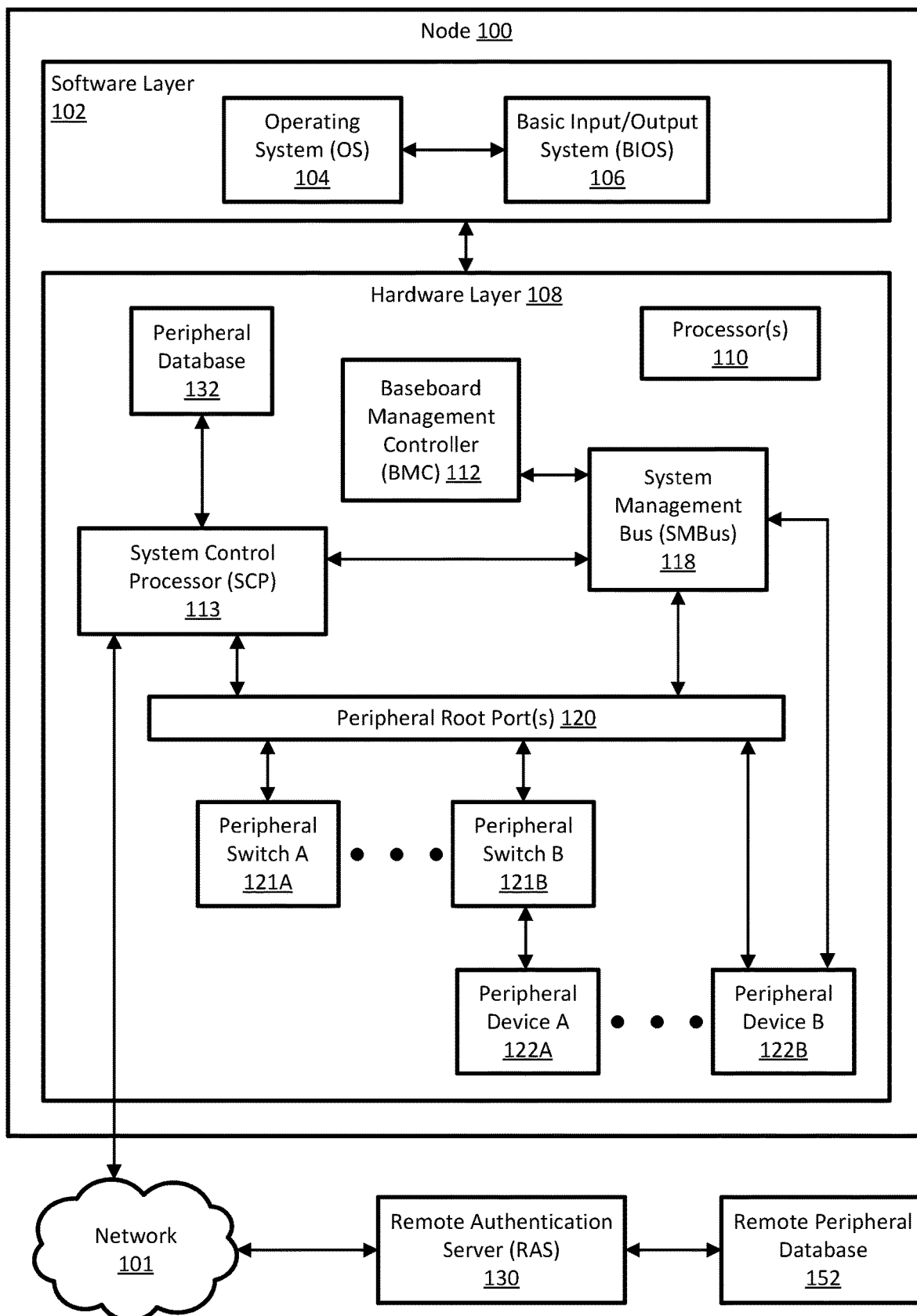
FIG. 1 shows a diagram of a system, in accordance with one or more embodiments.

In general, embodiments relate to systems and methods for remotely enabling, disabling, and metering the usage of peripheral devices of a node (e.g., a computing device) based on permissions criteria set for an end user. When an end-user customer rents a node, that node may often be pre-built to include standard components that are commonly used by customers. However, a frugal customer may desire to reduce their rental cost by customizing their node to remove some of the pricier standard components. Accordingly, the equipment owner may spend resources to modify the node to the specifications detailed by the customer (i.e., removing components). Such modifications cost time, risk damaging the components of the node, and increase the complexity of managing inventory. Further, customers that remove components often later desire to have those components re-installed in order to utilize their functionality. Such requests require locating, shipping, and remotely guiding the installation of such components again consuming the owner's time and resources.

One possible solution to these problems is to provide the entire node to the customer, but disable (or otherwise lock) the unwanted components. However, this solution is not without its faults. Depending on how the components are disabled, savvy customers may be able to re-enable (or otherwise unlock) the restricted components. In such cases, the owner is unaware of, and is uncompensated for, the equipment usage.

Accordingly, another possible solution to these problems is to provide the entire node to the customer, but require the customer to install (or keep installed) owner-provided software that is configured to monitor (and possibly control) which components of the node are accessible. Such user space software monitors for component usage and reports the data to a remote server—accessible by the owner. In turn, the customer may then be billed for their measured utilization of the monitored components. However, customers tend to dislike such software as user space resources are utilized and customers are inherently suspicious of software that (by its design) monitors customer usage of the node. Accordingly, customers may outright prohibit the use of such monitoring software in the operating system of the node.

Thus, as described herein, one or more embodiments provides a node that includes additional control hardware that is configured to (i) control access to and (ii) monitor the usage of peripheral devices installed in the node. Further, the control hardware may independently communicate with remote servers (accessible by the owner) thereby allowing for the ability to remotely enable, disable, and collect utilization data of the peripheral devices. Moreover, the control hardware executes entirely independently of the software space used by the customer—thereby reducing concern (by the customer) about the functionality and resources required to monitor the peripheral devices. And, due to the ability to remotely control and monitor the devices, customers may subscribe to one or more paid services for the usage of the rented peripherals (e.g., pay-as-you-go based on utilization, flat rate per hour/day/month, capped cost, limit on the number of operations, etc.). Lastly, if initially undesired peripherals are later wanted, the customer needs to only subscribe to that additional peripheral, and access to the peripheral may be remotely granted very shortly thereafter (avoiding potential problems of inventory, shipping, time delays, and troubleshooting remote installations).

Specific embodiments will now be described with reference to the accompanying figures. In the following description, numerous details are set forth as examples of one or more embodiments. One of ordinary skill in the art, having the benefit of this detailed description, would appreciate that one or more embodiments in this disclosure may be practiced without the specific details disclosed and that numerous variations or modifications may be possible and still remain in the scope of this detailed description. Certain details, known to those of ordinary skill in the art, may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments, any description of any component of a figure is to be interpreted as an optional embodiment, which may be implemented in addition to, in conjunction with, or in place of the embodiments described with regard to a corresponding like-named component in any other figure.

As used herein, adjective ordinal numbers (e.g., first, second, third, etc.) are used to distinguish between elements and do not create any particular ordering of the elements. As an example, a "first element" is distinct from a "second element", but the "first element" may come after (or before) the "second element" in an ordering of elements. Accordingly, an order of elements exists only if ordered terminology is expressly provided (e.g., "before", "between", "after", etc.) or a type of "order" is expressly provided (e.g., "chronological", "alphabetical", "by size", etc.). Further, use of ordinal numbers does not preclude the existence of other elements. As an example, a "table with a first leg and a second leg" is any table with two or more legs (e.g., two legs, five legs, thirteen legs, etc.). A maximum quantity of elements exists only if express language is used to limit the upper bound (e.g., "two or fewer", "exactly five", "nine to twenty", etc.). Similarly, singular use of an ordinal number does not imply the existence of another element. As an example, a "first threshold" may be the only threshold and therefore does not necessitate the existence of a "second threshold".

As used herein, the term "operative connection" (or "operatively connected") means the direct or indirect connection between devices that allows for interaction in some way (e.g., via the exchange of information). For example, the phrase 'operatively connected' may refer to a direct connection (e.g., a direct wired or wireless connection between devices) or an indirect connection (e.g., multiple wired and/or wireless connections between any number of other devices connecting the operatively connected devices).

As used herein, the word "data" is used as an "uncountable" singular noun—not as the plural form of the singular noun "datum". Accordingly, throughout the application, "data" is generally paired with a singular verb (e.g., "the data is modified"). However, "data" is not redefined to mean a single bit of digital information. Rather, as used herein, "data" means any one or more bit(s) of digital information that are grouped together (physically or logically). Further, "data" may be used as a plural noun if context provides the existence of multiple "data" (e.g., "the two data are combined").

FIG. 1 shows a diagram of a system, in accordance with one or more embodiments. A system may include a node (e.g., node (100)), a network (e.g., network (101)), and a remote authentication server (e.g., remote authentication server (RAS) (130)). Each of these components is described below.

In one or more embodiments, a network (e.g., network (101)) is a collection of connected network devices (not shown) that allow for the communication of data from one network device (not shown) to other network devices (not shown), or the sharing of resources among network devices (not shown). Non-limiting examples of a network (e.g., network (101)) include a local area network (LAN), a wide area network (WAN) (e.g., the Internet), a mobile network, any combination thereof, or any other type of network that allows for the communication of data and sharing of resources among network devices and/or devices operatively connected to the network (101). One of ordinary skill in the art, having the benefit of this detailed description, would appreciate that a network is a collection of operatively connected computing devices that enables communication between those computing devices.

In one or more embodiments, a node (e.g., node (100)) is a computing device (not shown). In one or more embodiments, a computing device is hardware that includes any one, or combination, of the following components:
 (i) processor(s),
 (ii) memory (volatile and/or non-volatile),
 (iii) persistent storage device(s),
 (iv) internal physical interface(s) (e.g., peripheral ports, serial advanced technology attachment (SATA) ports, peripheral component interconnect (PCI) ports, PCI express (PCIe) ports, next generation form factor (NGFF) ports, M.2 ports, etc.),
 (v) external physical interface(s) (e.g., universal serial bus (USB) ports, recommended standard (RS) serial ports, audio/visual ports, etc.),
 (vi) communication interface(s) (e.g., network ports, small form-factor pluggable (SFP) ports, wireless network devices, etc.),
 (vii) input and output device(s) (e.g., mouse, keyboard, monitor, other human interface devices, compact disc (CD) drive, other non-transitory computer readable medium (CRM) drives).

Further, in one or more embodiments, the persistent storage (and/or memory) of the computing device may store computer instructions (e.g., computer code) which, when executed by the processor(s) of the computing device (e.g., as software), cause the computing device to perform one or more processes specified in the computer instructions. Non-limiting examples of a computing device include a general purpose computer (e.g., a personal computer, desktop, laptop, tablet, smart phone), a network device (e.g., switch, router, multi-layer switch, etc.), a server (e.g., a blade-server in a blade-server chassis, a rack server in a rack, etc.), a controller (e.g., a programmable logic controller (PLC)), and/or any other type of computing device with the aforementioned capabilities.

In one or more embodiments, the node (100) may include a software layer (e.g., software layer (102)) and a hardware layer (e.g., hardware layer (108)). Each of these components is described below.

In one or more embodiments, a software layer (e.g., software layer (102)) is a collection of virtual software components (e.g., sets of instructions, software) executing on one or more processor(s) (110). The software layer (102) may include a user space (not shown), an operating system (OS) (104), and/or a basic input/output system (BIOS) (106). Each of these components is described below.

In one or more embodiments, OS (e.g., OS (104)) is software executing on the node (100). In one or more embodiments, an OS (104) coordinates operations between software executing in user space (not shown) and the BIOS (106) to facilitate the proper use of the components of the hardware layer (108) (e.g., processor(s) (110), peripheral devices (122), etc.). The OS (104) may allow for the creation of a user space software environment that provides a virtual space in which user-initiated software may execute.

In one or more embodiments, the OS (104) does not have direct access to underlying hardware components (e.g., those of hardware layer (108)). Instead, software executing in the OS (104) must provide commands and/or requests to the BIOS (106), which coordinates the exchange of information between hardware components and the OS (104).

In one or more embodiments, a BIOS (e.g., BIOS (106)) is firmware executing on the node (100) that is used to initialize hardware components (e.g., peripheral device A (122A), peripheral device B (122B)) prior to the OS (104) initializing. In one or more embodiments, the BIOS (106) may be a unified extensible firmware interface (UEFI) or similar firmware for initializing hardware. The BIOS (106) may coordinate operations between software executing in OS (104) and the hardware layer (108) to facilitate the proper use of the hardware components therein. Specifically, the BIOS (106) may be firmware that interacts with a baseboard management controller (BMC) (e.g., BMC (112)), system control processor (SCP) (113), and/or one or more peripheral port(s) (e.g., peripheral root port(s) (120), peripheral switches (121)).

In one or more embodiments, a hardware layer (e.g., hardware layer (108)) is a collection of physical components configured to perform the operations of the node (100) and/or otherwise execute the software of the node (100) (e.g., OS (104), BIOS (106)). The hardware layer (108) may include one or more processor(s) (110), a baseboard management controller (BMC) (112), system control processor (SCP) (113), a system management bus (SMBus) (118), one or more peripheral root port(s) (120), one or more peripheral switch(es) (e.g., peripheral switch A (122A), peripheral switch B (122B)), and one or more peripheral devices (e.g., peripheral device A (122A), peripheral device B (122B)). Each of these components is described below.

In one or more embodiments, a processor (e.g., processor(s) (110)) is an integrated circuit for processing instructions (e.g., software in the software layer (102), OS (104), BIOS (106)), and/or those received via a communication interface (not shown). In one or more embodiments, a processor (110) may be one or more processor cores or processor micro-cores.

In one or more embodiments, a baseboard management controller (BMC) (e.g., BMC (112)) is a computing device (which may include its own processor (not shown), memory (not shown), and execute its own OS (not shown)) that performs operations related to system management (e.g., of other hardware components) and/or monitors the status (e.g., "health") of other hardware components. Further, the BMC (112) may be configured to communicate with other hardware components (e.g., system control processor (SCP) (113), peripheral device(s) (122A, 122B), peripheral root port(s) (120)) via one or more communication interfaces and protocols. As an example, BMC (112) may communicate via the SMBus (118) and/or a peripheral root port (120) using their corresponding protocols.

In one or more embodiments, a system control processor (SCP) (e.g., system control processor (SCP) (113)) is a computing device (which may include its own processor (not shown), memory (not shown), and execute its own OS (not shown)) that performs operations related to peripheral management (e.g., of the peripheral root port(s) (120), peripheral switch(es) (121), and peripheral device(s) (122)). Further, the SCP (113) may be configured to communicate with other hardware components (e.g., BMC (112), peripheral device(s) (122), peripheral root port(s) (120)) via one or more communication interfaces and protocols. As an example, SCP (113) may communicate via the SMBus (118) and/or a peripheral root port (120) using their corresponding protocols. In one or more embodiments, the SCP (113) may use the SMBus (118) and its various connections to each peripheral port (120, 121) and peripheral device (122) in order to maintain an "inventory" (e.g., in the peripheral database (132)) of available peripheral ports and installed peripheral devices (122). In one or more embodiments, the SCP (113) maintains a peripheral database (132) and may perform some or all of the methods shown in FIGS. 3, 4, and 5.

In one or more embodiments, the BMC (112) and the SCP (113) may be combined into a single device that performs any or all of the functions of the both the BMC (112) and SCP (113). Further, in one or more embodiments where the BMC (112) and SCP (113) are separate devices, either one (or both) of the two devices (the BMC (112) or the SCP (113)) may have some or all of the functionalities and perform all of the processes of the other device.

In one or more embodiments, the BMC (112) and the SCP (113) may operate entirely independently from any software layer (102) software and processes (e.g., OS (104), BIOS (106)). That is, as each of the BMC (112) and SCP (113) may be their own computing device, there may be no reliance on interaction with the software layer (102)— although such communications are still possible.

In one or more embodiments, a peripheral database (e.g., peripheral database (132)) is a data structure that includes one or more peripheral entries (not shown). Additional details regarding the peripheral database (132) and the peripheral entries may be found in the description of FIG. 2.

In one or more embodiments, a system management bus (SMBus) (e.g., SMBus (118)) is a system used for sending and receiving data relating to the management of hardware layer (108) devices. In one or more embodiments, an SMBus (118) allows for communication via an interface and protocol (e.g., inter-integrated circuit ($I^2C$)) that is commonly recognized by the devices utilizing the SMBus (118). Additionally, the protocol used to communicate over the SMBus (118) may allow for only specific types of data and configurations, thereby eliminating potential security concerns with new and/or unknown devices as those devices cannot initiate malicious actions over the limited SMBus (118).

In one or more embodiments, a peripheral root port (e.g., peripheral root port(s) (120)) is an interface that allows for communication (i.e., data flow) between peripheral devices (e.g., 122A, 122B) and other system components (e.g., processor(s) (110), SCP (113), etc.). A peripheral root port (120) may provide one or more common interfaces and protocols (e.g., PCI, PCIe, M.2, SATA, etc.) allowing a peripheral device (122) to be operatively connected and communicate with other components of the node (100). In one or more embodiments, a peripheral root port (120) (and/or the operations thereof) may be implemented (i) as part of one or more processor(s) (110), or (ii) as an independent integrated circuit (e.g., an application specific integrated circuit (ASIC), field programmable gate array (FPGA), etc.).

In one or more embodiments, a peripheral root port (120) may allow for one or more peripheral communication channels (e.g., data, management, status channels) and/or one or more peripheral communication types (e.g., data transfer, vendor defined messages (VDM), identifying information, etc.). Further, peripheral root port(s) (120) may include the functionality to act as a system firmware intermediary (SFI) that may intercept, modify, filter, forward, and/or otherwise alter data emanating from (or destined to) a peripheral device (122) based on those peripheral communication channels and/or peripheral communication types. Further, in one or more embodiments, a peripheral root port (120), as an SFI, may be configured to block (i.e., filter) all traffic to a peripheral device (122) regardless of peripheral communication channel and/or peripheral communication type. As a non-limiting example, a peripheral root port (120) may block communication over all peripheral communication channels except a "management channel". As another non-limiting example, a peripheral root port (120) may reject, block, and/or otherwise deny all messages to and from a peripheral device (122) unless those messages are "vendor defined messages" (VDM). In one or more embodiments, filtering peripheral communication channels and/or peripheral communications may be enabled and/or disabled by toggling one or more physical and/or logical switch(es) in the peripheral root port (120).

In one or more embodiments, use and/or modification of the SFI functionalities of a peripheral root port (120) may require authentication. That is, a command sent to a peripheral root port to block (or unblock) a peripheral device (122), via the SFI, may require some form of authentication in order for the peripheral root port (120) to implement the command. Accordingly, a peripheral root port (120) may be equipped with some means of authentication (e.g., a public/private key, a pre-shared secret, security protocol and data model (SPDM), etc.) that allows for only authorized access and control of the SFI functionality of the peripheral root port (120). As a non-limiting example, an SCP (113) and/or a BMC (112) may possess the means for authenticating access to the SFI of the peripheral root port (120) (e.g., possess a matching public key, possess the pre-shared secret, etc.), whereas SFI commands received from the software layer (102) may not possess any means for authenticating the SFI commands. Accordingly, only authorized SFI commands may enable access to peripheral devices (122). In one or more embodiments, the remote authentication server (RAS) (130) possesses the means for authenticating access to the SFI of one or more peripheral root port(s) (120) and may provide those means to the SCP (113) and/or BMC (112) when needed and/or requested.

In one or more embodiments, a peripheral switch (e.g., peripheral switch A (121A), peripheral switch B (121B)) is hardware that may be operatively connected to one or more peripheral root port(s) (120) to increase the number of peripheral interfaces in the node (100). The peripheral switch (121) may include one or more peripheral downstream port(s) (not shown) to interface with one or more peripheral device(s) (122). As a non-limiting example, if a node (100) includes only a single peripheral root port (e.g., 120), but two peripheral devices (e.g., 122A, 122B) are desired, a peripheral switch (e.g., 121) that offers (at least) two peripheral downstream ports may be added to the node (100) and operatively connected to the single peripheral root port (e.g., 120). Accordingly, using the peripheral switch (e.g., 121), two peripheral devices (e.g., 122A, 122B) may be operatively connected to the node (100) (via a peripheral switch (e.g., 121)) despite only a single peripheral root port (e.g., 120) existing in the node (100).

As another non-limiting example, if the node (100) includes five peripheral root ports (e.g., 120) yet ten peripheral devices (e.g., 122A, 122B, others (not shown)) are desired, a six-port peripheral switch (e.g., 121) may be added to one of the five peripheral root ports (e.g., 120). Once added, four (of the five) peripheral root ports (e.g., 120) would be remain open and all six of the peripheral downstream ports of the peripheral switch (e.g., 121) would be open, thereby allowing for a total of ten peripheral devices (e.g., 122A, 122B, others) to be simultaneously operatively connected. One of ordinary skill in the art, having the benefit of this detailed description, would appreciate the function, operation, and usage of a peripheral switch (121) to increase the number of available peripheral ports.

In one or more embodiments, each peripheral downstream port (not shown) included in a peripheral switch (121) may be controlled independently from the peripheral root port (120) to which the peripheral switch (121) is operatively connected. That is, each peripheral downstream port within a peripheral switch (121) may include all of the same functionality and capabilities of a peripheral root port (120) (e.g., SFI, the ability to enable and/or disable filtering of peripheral communication channels and/or peripheral communication types).

As used herein, the generic term "peripheral port" refers to any single peripheral root port (120) or any single peripheral downstream port of a peripheral switch (121). Similarly, the plural term "peripheral ports" refers to any or all peripheral root ports (120) and to any or all peripheral downstream ports (of any peripheral switch (121)).

In one or more embodiments, a peripheral device (e.g., peripheral device A (122A), peripheral device B (122B)) is a hardware computing device. Non-limiting examples of a peripheral device (122) include a graphical processing unit (GPU), a processor, a network interface controller (NIC), a storage device (e.g., a non-volatile memory express (NVMe) drive), and/or any other hardware computing device. Peripheral devices (122) may be operatively connected to any peripheral port via one or more common interfaces and protocols (e.g., PCI, PCIe, M.2, SATA, etc.). Additionally, as shown in FIG. 1, peripheral devices (122) may be operatively connected to the SMBus (118) via a common interface and protocol (e.g., inter-integrated circuit ($I^2C$)) (as shown for peripheral device B (122B)).

In one or more embodiments, a peripheral bus (shown as the connections between "peripheral" components (120, 121, 122) and to the SCP (113)) is a system used for sending and receiving data between components of the hardware layer (108). In one or more embodiments, the peripheral bus allows for communication via an interface and protocol (e.g., PCI, PCIe, M.2, SATA, etc.) that is commonly recognized by the devices utilizing the peripheral bus. In one or more embodiments, the SCP (113) communicates over the peripheral bus using vendor defined messages (VDM) as an "out of band" method of transmitting data to one or more "peripheral" components (120, 121, 122).

In one or more embodiments, a remote authentication server (RAS) (e.g., remote authentication server (RAS) (130)) is a computing device, connected to the node (100) via a network (101). An RAS (130) may execute software that communicates with the SCP (113) to provide data and/or commands related to one or more peripheral device(s) (122). In one or more embodiments, an RAS (130) may maintain a remote peripheral database (152).

In one or more embodiments, a remote peripheral database (e.g., remote peripheral database (152)) is substantially similar to the peripheral database (132), except that is maintained by the RAS (130).

While FIG. 1 shows a specific configuration of a system, other configurations may be used without departing from the scope. Accordingly, embodiments disclosed herein should not be limited to the configuration of devices and/or components shown in FIG. 1.

Figure 2:
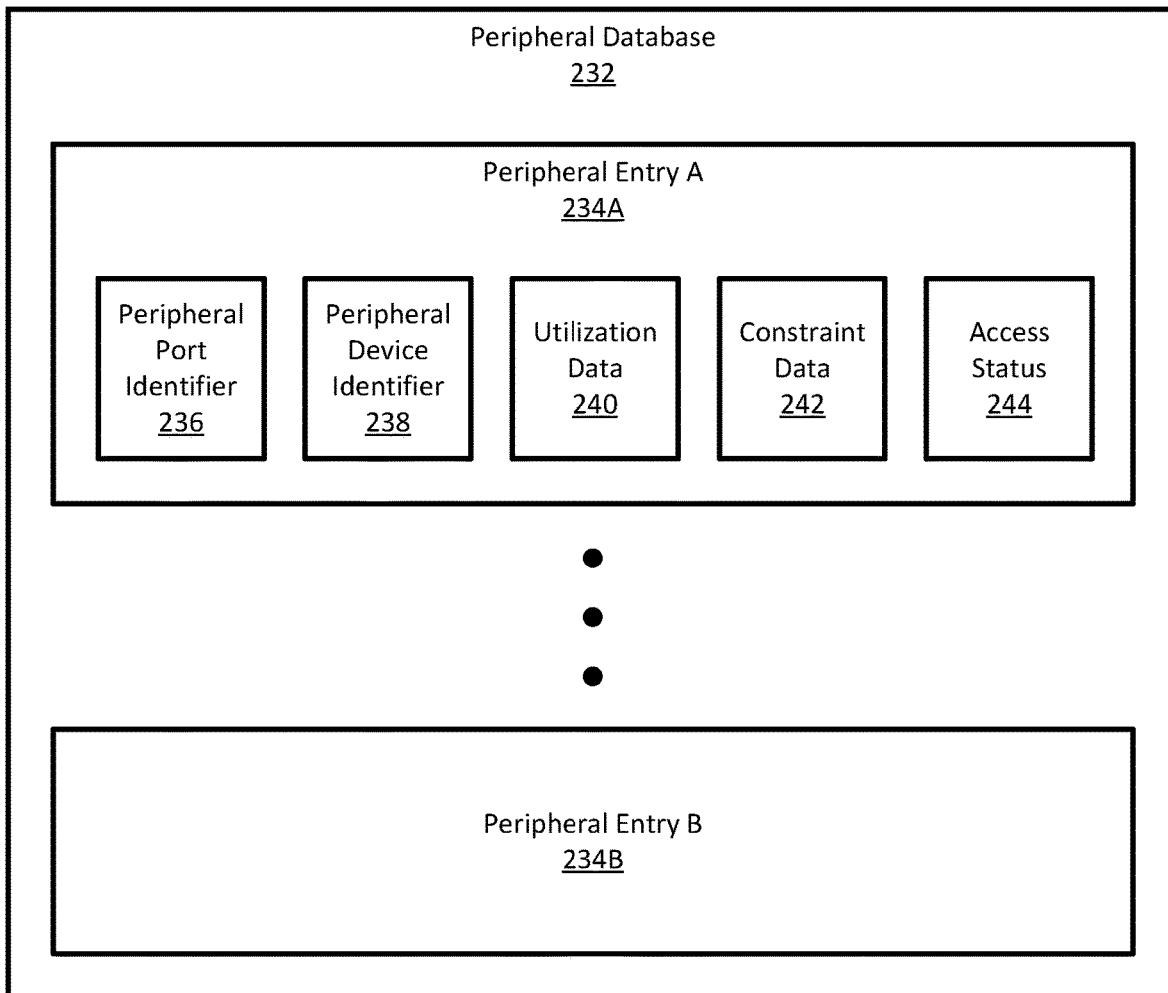
FIG. 2 shows a diagram of a peripheral database, in accordance with one or more embodiments.

FIG. 2 shows a diagram of a peripheral database, in accordance with one or more embodiments. A peripheral database (232) is a data structure (e.g., a table, a delimited text file, a database file, etc.) that may include one or more peripheral entries (e.g., peripheral entry A (234A), peripheral entry B (234B)), described below.

In one or more embodiments, a peripheral entry (e.g., peripheral entry A (234A), peripheral entry B (234B)) is a data structure (e.g., a row in a table, a delimited entry, etc.) within the peripheral database (232). In one or more embodiments, a peripheral entry (234) exists for each peripheral port in the node. A peripheral entry (234) may include one or more of the following:

(i) a peripheral port identifier (236) that uniquely identifies a single peripheral port (i.e., a peripheral root port, a peripheral downstream port). Non-limiting examples of an identifier include a unique tag, alphanumeric entry, a filename, a serial number, and a row number in table, (ii) a peripheral device identifier (238) that uniquely identifies the peripheral device present in the peripheral port and/or the peripheral device that is assigned to the peripheral port, (iii) utilization data (240) that includes data related to the usage of the peripheral device (the peripheral device identified by the peripheral device identifier (238) in the same peripheral entry (234)). Non-limiting examples of utilization data (240) include (i) time/duration used, (ii) number of operations performed, (iii) calculated monetary rental cost, or (iv) any other measured utilization metric, (iv) constraint data (242) that includes data providing one or more usage limitations of the peripheral device (the peripheral device identified by the peripheral device identifier (238) in the same peripheral entry (234)). Non-limiting examples of constraint data (242) include a maximum/limit for (i) time/duration used, (ii) number of operations performed, (iii) cost (e.g., $500 per hour, $100 per hour for 50 hours each month), or (iv) any other measured utilization metric, and (v) access status (244) that provides a status of whether the peripheral device should be accessible, limited, or inaccessible by the software layer (e.g., "access" or "limited access" or "no access", "2" or "1" or "0", etc.).

In one or more embodiments, the SCP may maintain an "inventory" of peripheral devices via the peripheral database (232). Further, the SCP may enforce against reconfiguring the node, by requiring each peripheral device to be installed in the peripheral port associated in the corresponding peripheral entry. As a non-limiting example, an end-user may attempt to gain access to a "locked" peripheral device (e.g., a GPU) by switching two PCIe devices—placing the GPU in an "open" peripheral port and placing an "unlocked" NVMe drive in a "closed" peripheral port. In such a case, the SCP would not allow access to either device as the peripheral database (232) would include two peripheral entries (234) where the expected peripheral device identifiers (238) (for the two associated peripheral port identifiers (236)) do not match the actual peripheral device identifiers (238) (because the GPU and NVMe drive were swapped).

While FIG. 2 shows a specific configuration of a peripheral database, other configurations may be used without departing from the scope. Accordingly, embodiments disclosed herein should not be limited to the configuration of devices and/or components shown in FIG. 2.

Figure 3:
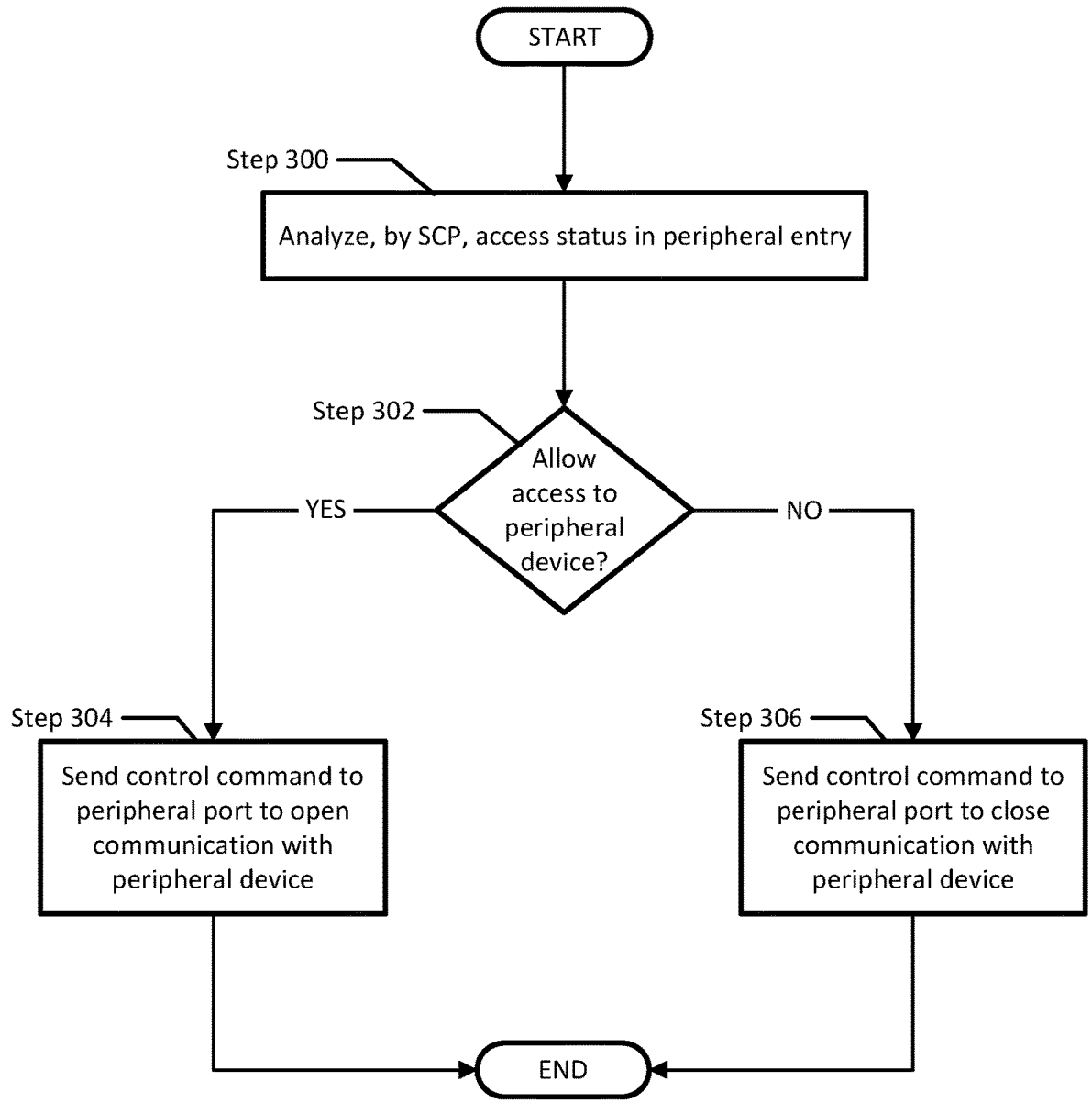
FIG. 3 shows a flowchart of a method of enforcing access to a peripheral device, in accordance with one or more embodiments.

FIG. 3 shows a flowchart of a method of enforcing access to a peripheral device, in accordance with one or more embodiments. All or a portion of the method shown in FIG. 3 may be performed by one or more components of the SCP. However, another component of the system may perform this method without departing from the scope of the disclosed embodiments. While the various steps in this flowchart are presented and described sequentially, one of ordinary skill in the relevant art will appreciate that some or all of the steps may be executed in different orders, may be combined or omitted, and some or all steps may be executed in parallel. In one or more embodiments, the method of FIG. 3 is performed for each peripheral port (or peripheral device) in the node.

In Step 300, the SCP analyses the peripheral database to determine the access status for a peripheral port. In one or more embodiments, the SCP reads the access status of a peripheral entry, in the peripheral database, to identify if the peripheral device should be able to communicate with other components of the node.

In one or more embodiments, by default, all communication (i.e., data transfer) between a peripheral device and the peripheral port (in which the peripheral device is inserted) is disabled until the peripheral port affirmatively allows communication with the inserted peripheral device (i.e., peripheral devices are initially quarantined). Accordingly, upon initial insertion of the peripheral device into the node (or upon initialization of the node), all communication between the peripheral device and the peripheral port is blocked. Thus, the peripheral device is not able to send or receive communication with the peripheral port and any attempts by the peripheral device to inject any code into the node (via the peripheral port) are prevented.

In one or more embodiments, the SCP (via the peripheral database) is aware of all peripheral ports in the node and which peripheral devices are present (i.e., plugged, inserted, installed) into those peripheral ports. Further, the SCP may detect the presence of the peripheral device (in a peripheral port) via one or more conductive pathways that operably link the peripheral device to the SCP (e.g., a "physical presence pin" on the peripheral port activated by the peripheral device). Further, the SCP may detect the presence of a peripheral device via a software mechanism that informs the SCP of the peripheral device's presence and/or via the SCP periodically attempting to access each peripheral device (e.g., "polling").

In Step 302, the SCP determines if a peripheral device should be accessible by reading the access status of the associated peripheral entry. In one or more embodiments, the SCP determines if the peripheral device should be accessible via the access status. As a non-limiting example, the SCP allows access to the peripheral device if the corresponding access status has a value that indicates affirmative permissions (e.g., "access", "allow" "active", "granted", "yes", "1", etc.). Conversely, as a non-limiting example, the SCP would limited or not allow access to the peripheral device if the access status has a value that indicates a lack of permissions (e.g., "limited access", "throttle", "no access", "disallow" "inactive", "denied", "no", "0", etc.) or is otherwise empty (e.g., " ", "null").

If the SCP determines that peripheral device should be accessible by the node (Step 302—YES), the method proceeds to Step 304. However, if the SCP determines that peripheral device should be limited or not accessible by the node (Step 302—NO), the method proceeds to Step 306.

In Step 304, the SCP sends a control command to open the peripheral port specified by the peripheral port identifier in the peripheral entry. In one or more embodiments, the SCP sends a control command to the peripheral port to open one or more peripheral communication channels with the peripheral device (e.g., using the SFI functionality of the peripheral port), thereby allowing communication (i.e., data transfer) between the peripheral port and the peripheral device. In turn, the peripheral port may communicate with the peripheral device without further blocking, and may inform other components of the node that the peripheral device is connected and operational. The command to the peripheral port may specify unmasking an "interrupt" (e.g., a message to the BIOS or OS regarding the insertion of the peripheral device).

In one or more embodiments, communication between the SCP and the peripheral port may occur via the peripheral bus, the SMBus, the node's processor (e.g., using software layer services to facilitate the communication), and/or via some other form of communication operatively connecting the SPC and the peripheral port. In one or more embodiments, when communicating via the SMBus, the SCP may communicate directly with the peripheral port or via the BMC (e.g., the SCP sends a command to the BMC, and in turn, the BMC sends a command to the peripheral port).

In Step 306, the SCP sends a control command to close the peripheral port specified by the peripheral port identifier in the peripheral entry. In one or more embodiments, the SCP sends a control command to the peripheral port to close one or more peripheral communication channels with the peripheral device (e.g., using the SFI functionality of the peripheral port), thereby disallowing communication (i.e., data transfer) between the peripheral port and the peripheral device. In turn, the peripheral device cannot communicate with the peripheral port or other components of the node.

Alternatively, in one or more embodiments, instead of completely closing the peripheral port and cutting access to the peripheral device, the SCP may command the peripheral port to set a maximum utilization of the peripheral device (e.g., throttle, bottleneck). As a non-limiting example, a customer may implement a tiered cost system, where the customer is willing to pay for 10 hours of maximum throughput, costing $100 per hour. Then, once those 10 hours are used, the customer sets a second tier of unlimited usage of "limited" throughput, costing $5 per hour.

Figure 4:
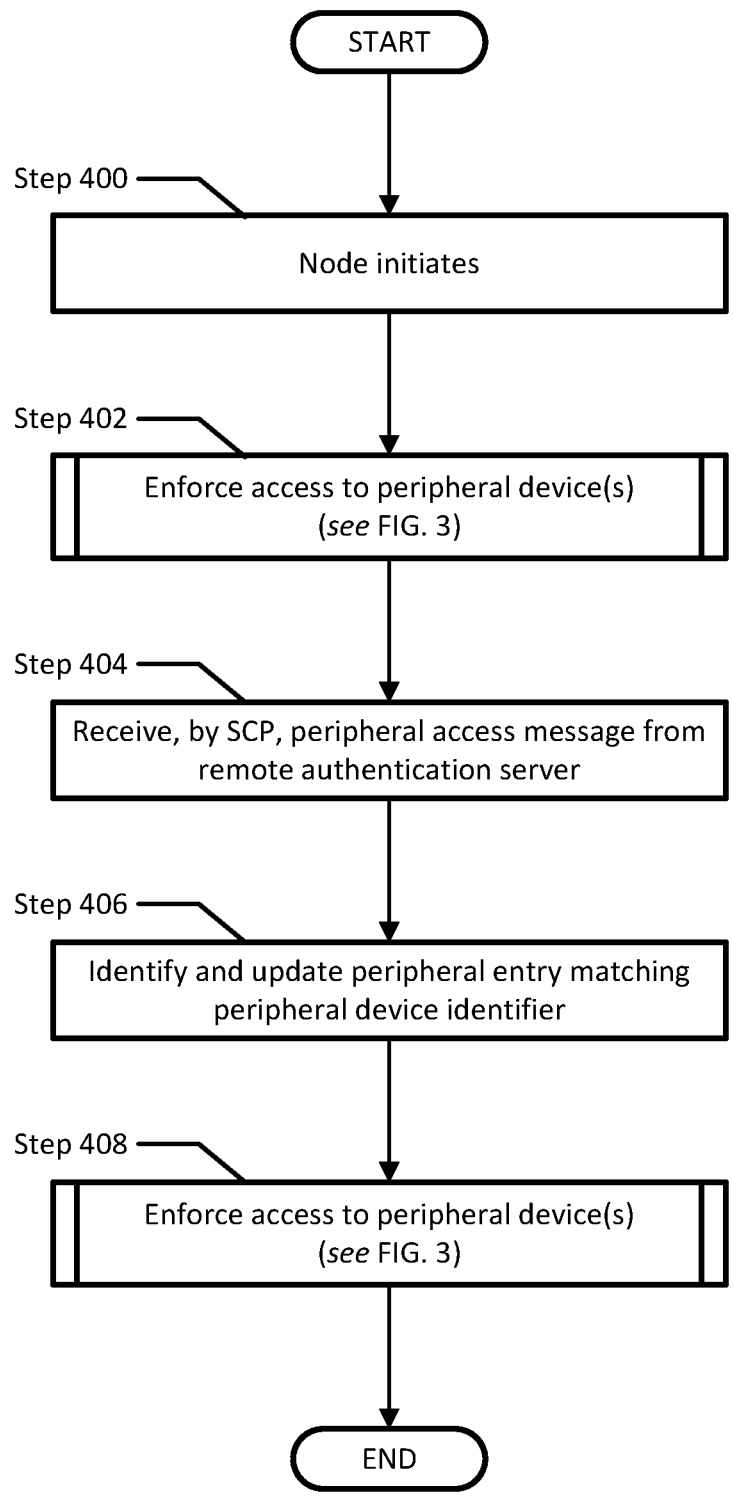
FIG. 4 shows a flowchart of a method of remotely providing access to a peripheral device, in accordance with one or more embodiments.

FIG. 4 shows a flowchart of a method of remotely providing access to a peripheral device, in accordance with one or more embodiments. All or a portion of the method shown in FIG. 4 may be performed by one or more components of the SCP. However, another component of the system may perform this method without departing from the scope of the disclosed embodiments. While the various steps in this flowchart are presented and described sequentially, one of ordinary skill in the relevant art will appreciate that some or all of the steps may be executed in different orders, may be combined or omitted, and some or all steps may be executed in parallel.

In Step 400, the node initiates (e.g., "boots up" from an "off" state). In one or more embodiments, the node may initiate after being shut down, rebooted, or performing a partial reboot of some operations (e.g., a "soft reset").

In Step 402, the SCP enforces access to one or more peripheral device(s) per the access status(es) in the peripheral database. In one or more embodiments, the SCP analyzes the access status of each peripheral entry and enables, restricts, or disables access to the respective peripheral devices (or does nothing if the current access status is already applied). The step is substantially similar to the process performed in FIG. 3.

In Step 404, the SCP receives a peripheral permissions message from the remote access server (RAS). In one or more embodiments, the peripheral access message may include (i) a peripheral device identifier, (ii) constraint data, and (iii) an access status. The RAS may communicate with the SCP via a network that operatively connect the node to the RAS.

In one or more embodiments, the RAS may send a peripheral permissions message (to the SCP) due to a change in access status and/or constraint data in the remote peripheral database. In one or more embodiments, an end-user (e.g., a customer renting the node) may log into a cloud service (operatively connected to the RAS) and purchase additional services and/or functionality of the node. In turn, the RAS may update the remote peripheral database and send the peripheral permissions message to SCP with the updated permissions.

In Step 406, the SCP identifies the peripheral entry that matches (e.g., includes) the peripheral device identifier included in the peripheral permissions message (received in Step 404). Once identified, the SCP updates the peripheral entry to include the data present in the peripheral permissions message. As a non-limiting example, the SCP may overwrite existing constraint data and/or the access status (of a peripheral entry) with the constraint data and/or the access status provided in the peripheral permissions message, respectively.

In Step 408, the SCP enforces access to one or more peripheral device(s) per the access status(es) in the peripheral database. In one or more embodiments, the SCP analyzes the access status of each peripheral entry and enables, restricts, or disables access to the respective peripheral devices (or does nothing if the current access status is already applied). The step is substantially similar to the process performed in FIG. 3.

Figure 5:
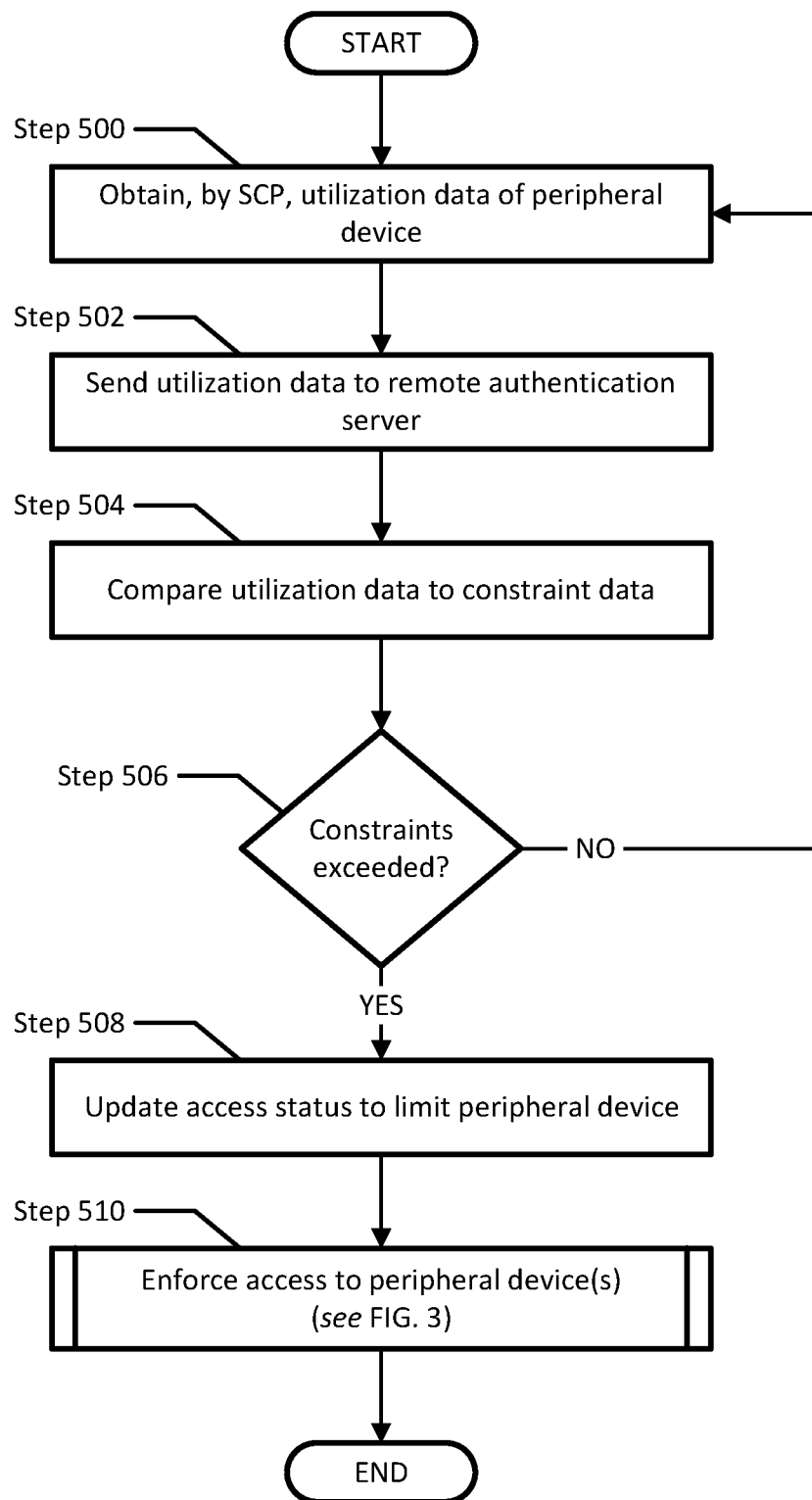
FIG. 5 shows a flowchart of a method of monitoring usage of a peripheral device, in accordance with one or more embodiments.

FIG. 5 shows a flowchart of a method of monitoring usage of a peripheral device, in accordance with one or more embodiments. All or a portion of the method shown in FIG. 5 may be performed by one or more components of the SCP. However, another component of the system may perform this method without departing from the scope of the disclosed embodiments. While the various steps in this flowchart are presented and described sequentially, one of ordinary skill in the relevant art will appreciate that some or all of the steps may be executed in different orders, may be combined or omitted, and some or all steps may be executed in parallel. In one or more embodiments, the method of FIG. 5 is performed for each peripheral port (or peripheral device) in the node.

In Step 500, the SCP monitors the utilization of a peripheral device. In one or more embodiments, the SCP may request and receive (or otherwise obtain) utilization data from a peripheral device and/or a peripheral device may publish (or otherwise 'push') utilization data to the SCP. In turn, upon receipt of utilization data from a peripheral device, the SCP updates the utilization data in the respective peripheral entry in the peripheral database. In one or more embodiments, utilization data is only obtained from peripheral devices connected to "open" peripheral ports.

In Step 502, the SCP sends the utilization data to the remote access server (RAS). In one or more embodiments, the RAS may store, analyze, modify, and/or serve, the utilization data—independently of the SCP. The SCP may communicate with the RAS via a network that operatively connects the node to the RAS. In one or more embodiments, the RAS may meter (e.g., measure the usage of and calculate a cost for) the peripheral device.

In Step 504, the SCP compares the utilization data to the constraint data. As discussed in the description of FIG. 2, the utilization data for a peripheral device may include (i) time/duration used, (ii) number of operations performed, (iii) calculated monetary rental cost, or (iv) any other measured utilization metric. Similarly, the constraint data may contain any one or more thresholds for any corresponding utilization data, such as a maximum/limit for (i) time/duration used, (ii) number of operations performed, (iii) cost (e.g., $500 per hour, $100 per hour for 50 hours each month), or (iv) any other measured utilization metric.

In Step 506, the SCP determines if the utilization data of a peripheral device has exceeded any of the corresponding constraint data for that same peripheral device (e.g., in the same peripheral entry). As a non-limiting example, if the constraint data includes two constraints (e.g., a 10-hour limit and a 1 billion operations cap), the SCP may enforce a "whatever comes first" policy where if either constraint is met, access to the peripheral device is disabled. Accordingly, if the utilization data indicates that the peripheral device has been used for 9 hours (with 1 hour remaining) but 1 billion operations have been performed (with 0 operations remaining), the SCP determines that access to the peripheral device will be disabled.

In one or more embodiments, there may be constraint data specifying "$100 per hour for 50 hours each month", where the number of hours using the $100 tier within a billing period (e.g., a month) is set. Thus, if the billing period begins on the first of each month (resetting the 50-hour limit), the SCP analyzes the duration utilization data measured since the first of the month (and not overall) to determine if the constraint is satisfied.

If the SCP determines that utilization of a peripheral device is below (i.e., has not met or exceeded) all of the constraints (Step 506—NO), the method returns back to Step 500. However, if the SCP determines that utilization of a peripheral device has met (or exceeded) any of the constraints (Step 506—YES), the method proceeds to Step 508.

In Step 508, the SCP updates the access status of the peripheral entry to limit access to the peripheral device. In one or more embodiments, the SCP overwrites the existing access status with a value that would limit access to the peripheral device (e.g., those specified in Step 302) and therefore cause communications on the associated peripheral port to be closed or restricted (i.e., Step 306).

In Step 510, the SCP enforces access to one or more peripheral device(s) per the access status(es) in the peripheral database. In one or more embodiments, the SCP analyzes the access status of each peripheral entry and enables, restricts, or disables access to the respective peripheral devices (or does nothing if the current access status is already applied). The step is substantially similar to the process performed in FIG. 3.

In one or more embodiments, the RAS may perform Steps 504 and 506 (after receiving the utilization data from Step 502). Further, if the RAS determines that the peripheral device constraints have been exceeded (Step 506—YES), the RAS may send a command to the SCP to update the access status of the associated peripheral entry to disable access to the peripheral device (e.g., similar to the process of Steps 404 and 406). Further, in one or more embodiments, as part of Step 508, the RAS may issue a notification to the end-user (e.g., via email, popup, push notification, etc.) that the access to the peripheral device is now limited or disallowed.

In one or more embodiments, an RAS may generate one or more bills (i.e., invoices) based on the utilization data for a peripheral device (e.g., providing metering services). The RAS may send a bill to a user (e.g., via email). Additionally, a user may log into the RAS (or an operatively connected user interface) to view and pay the invoice(s).

FIG. 6 shows an example of a peripheral database, in accordance with one or more embodiments. The following use case is for explanatory purposes only and not intended to limit the scope to this embodiment.

As shown in FIG. 6, the example peripheral database (632) includes three peripheral entries (e.g., peripheral entry A (634A), peripheral entry B (634B), peripheral entry C (634C)), each with values for peripheral port identifiers (636), peripheral device identifiers (638), utilization data (240), constraint data (642), and access statuses (644).

For peripheral entry A (634A), the peripheral port identifier (636) is "1" indicating a unique peripheral root port. The peripheral device is an NVMe drive, with serial number "WD795135". Accordingly, the peripheral device identifier (638) is set "WD795135". The utilization data (640) includes a measured duration that the NVMe drive has been utilized, at "16.3 hours". Further, the constraint data (642) is set to "20 hours", indicating that 3.7 hours remain until the constraint is satisfied. Lastly, as the constraint data (642) is not satisfied, the access status (644) is set to "Allow".

For peripheral entry B (634B), the peripheral port identifier (636) is "P2-3" indicating a unique peripheral downstream port on a peripheral switch plugged into a peripheral root port. The peripheral device is a GPU, with serial number "NVDAGX800". Accordingly, the peripheral device identifier (638) is set "NVDAGX800". The utilization data (640) includes a measured usage cost of "$15,678". Further, the constraint data (642) is set to "$10,000", indicating that the constraint is satisfied (and surpassed). Lastly, as the constraint data (642) is satisfied, the access status (644) is set to "Limited" thereby allowing for some lesser usage of the GPU.

For peripheral entry C (634C), the peripheral port identifier (636) is "JPS1204" indicating a unique peripheral port. The peripheral device is a data processing unit (DPU), with serial number "S2-8NVD". Accordingly, the peripheral device identifier (638) is set "S2-8NVD". The utilization data (640) includes a measured operation count of "6 giga-IOS" (6 billion operations). Further, the constraint data (642) is set to "6 giga-IOS", indicating that the constraint is satisfied. Lastly, as the constraint data (642) is satisfied, the access status (644) is set to "Deny" thereby allowing for no usage of the DPU.

Figure 7:
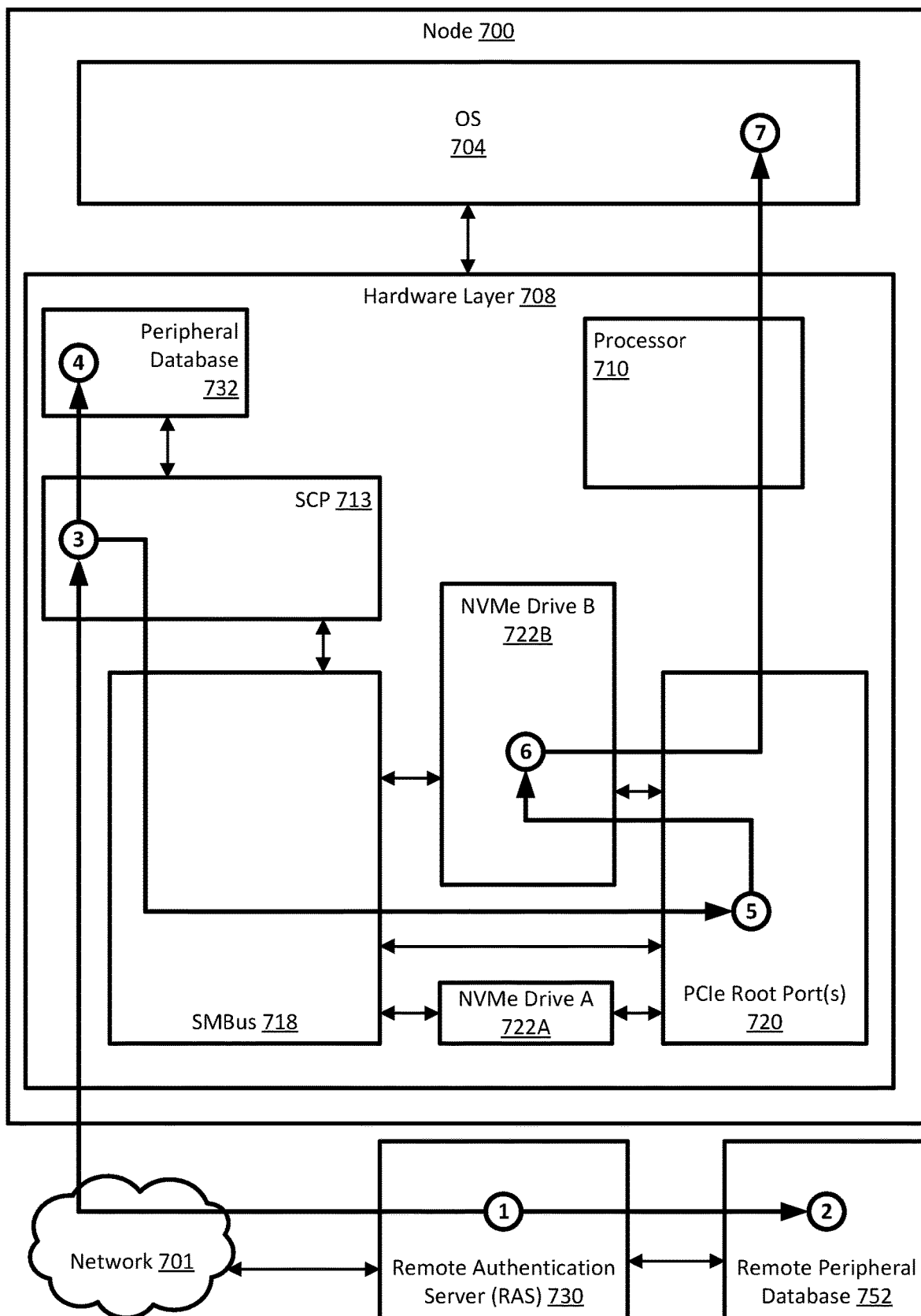
FIG. 7 shows an example of a method of remotely providing access to a peripheral device, in accordance with one or more embodiments.

FIG. 7 shows an example of a method of remotely providing access to a peripheral device, in accordance with one or more embodiments. The following use case is for explanatory purposes only and not intended to limit the scope to this embodiment.

In FIG. 7, consider a scenario in which—

Prior to (1), NVMe drive A (722A) is active and used by the OS (704). That is, the PCIe root port (720) connected to NVMe drive A (722A) is "open" and allowing for the usage of NVMe drive A (722A) without restrictions (e.g., by the OS (704)). Further, NVMe drive B (722B) is inactive as the PCIe root port (720) connected to NVMe drive B (722B) is "closed" and preventing any usage of NVMe drive B (722B).

At (1), a user of the node (700) logs into a user interface of the remote authentication server (RAS) (730) and submits payment for access to NVMe drive B (722B).

At (2), the RAS (730) updates the remote peripheral database (752) to change the access status (not shown) to "open" for the associated peripheral entry (not shown) that includes the peripheral device identifier (a unique serial number) associated with NVMe drive B (722B).

At (3), the RAS (730) sends a peripheral access message to the SCP (713) operating in the hardware layer (708) of the node (700) via network (701). The peripheral access message includes (i) the peripheral device identifier and (ii) an updated access status specifying "open".

At (4), the SCP (713) updates the peripheral database (732) to change the access status for the relevant peripheral entry (not shown) that includes the matching peripheral device identifier (received from the RAS (730)).

At (5), as part of a process to enforce access to peripheral devices, the SCP (713) sends an authenticated SFI control command to open the PCIe root port (720) in which NVMe drive B (722B) is inserted. The authenticated SFI control command is sent via the SMBus (718) operatively connecting the SCP (713) and the PCIe root port (720). Upon receipt of the authenticated SFI control command, the PCIe root port (720) authenticates the command message (e.g., verifies the key therein) and performs the action specified by the command (i.e., to open the port).

At (6), NVMe drive B (722B) becomes active as the PCIe root port (720) is unblocked and communications are permitted. In turn, NVMe drive B (722B) sends an interrupt to other components of the node (700) indicating that NVMe drive B (722B) is now available.

At (7), the OS (704) receives the interrupt from NVMe drive B (722B) (via processor (710)). Thereafter, the OS (704) and other components of the node (700) are able to utilize the functionalities of NVMe drive B (722B) (e.g., read/write data to it).

Figure 8:
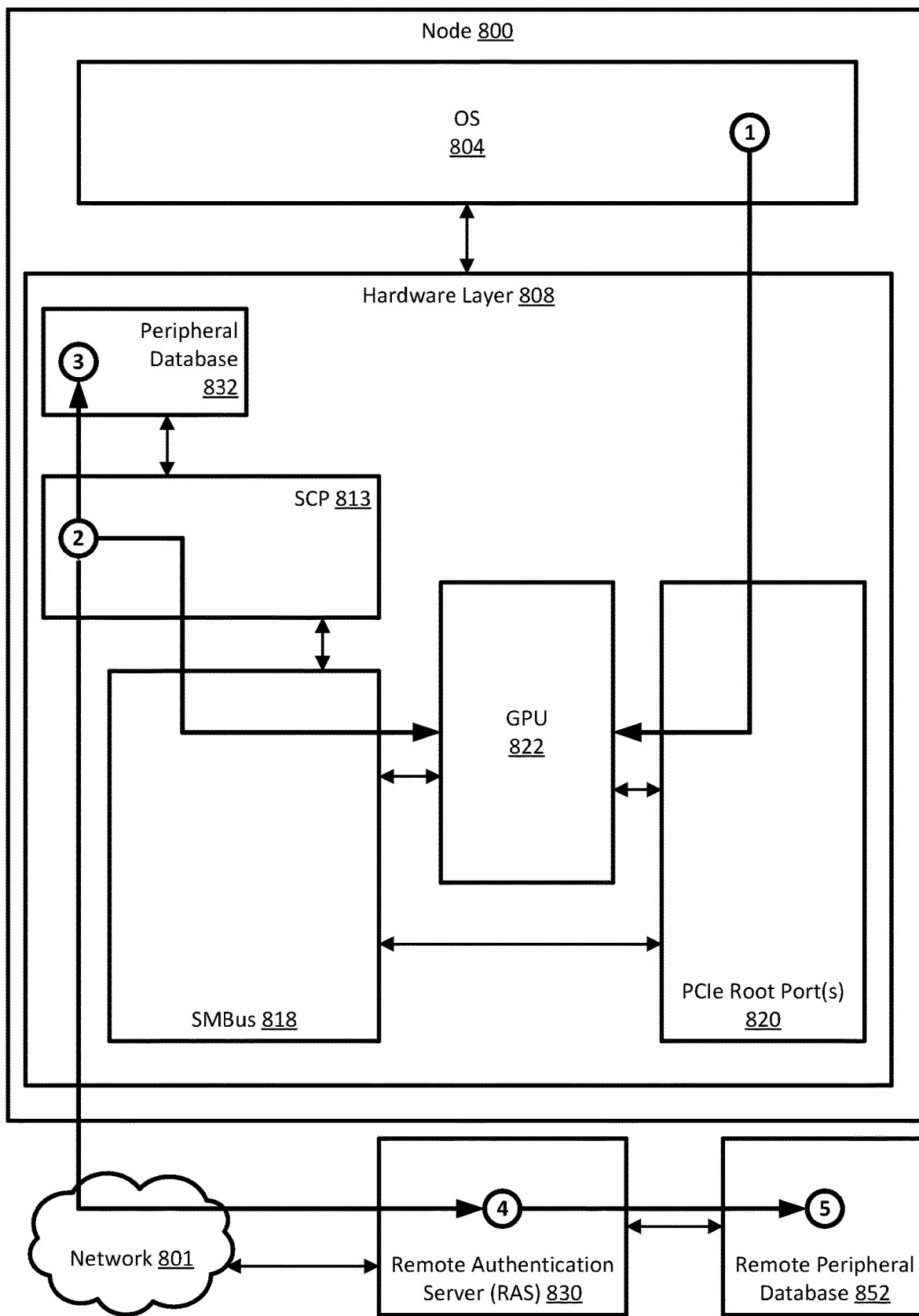
FIG. 8 shows an example of a method of metering access to a peripheral device, in accordance with one or more embodiments.

FIG. 8 shows an example of a method of metering access to a peripheral device, in accordance with one or more embodiments. The following use case is for explanatory purposes only and not intended to limit the scope to this embodiment.

In FIG. 8, consider a scenario in which—

At (1), the OS (804) (and/or a user thereof) is using the GPU (822) via a PCIe root port (820) in the hardware layer (808) of the node (800). At (2), the SCP (813) queries the utilization data from the GPU (822) via the SMBus (818). At (3), the SCP (813) writes the utilization data to the peripheral entry (associated with the GPU (822)) in the peripheral database (832).

At (4), the SCP (813) send the peripheral database (832) (or any modified peripheral entry) to the remote authentication server (RAS) (830) via the network (801). At (5), the RAS (830) updates the remote peripheral database (852) to include the data sent from the SCP (813) (including the utilization data obtained from the GPU (822)).

In turn, the RAS (830) generates an invoice based on the utilization data of the GPU. The RAS (830) then sends that invoice to a customer via email. Additionally, a user may log into the RAS (830) (or an operatively connected user interface) to view and pay the invoice.

While one or more embodiments have been described herein with respect to a limited number of embodiments and examples, one of ordinary skill in the art, having the benefit of this detailed description, would appreciate that other embodiments can be devised which do not depart from the scope of the embodiments disclosed herein. Accordingly, the scope should be limited only by the attached claims.

What is claimed is:

1. A node, comprising:
a processor executing a first operating system;
an open peripheral port connected to a peripheral device;
a system control processor executing a second operating system, wherein the system control processor is configured to perform a method for metering usage of the peripheral device by the first operating system, the method comprising:
obtaining, in response to sending a request to the peripheral device, utilization data from the peripheral device via the open peripheral port,
wherein the utilization data specifies a period of time the peripheral device is used, a number of operations performed on the peripheral device, and a monetary rental cost of the peripheral device; and
sending the utilization data to a remote authentication server, wherein the first operating system cannot access the system control processor.

2. The node of claim 1, wherein the first operating system is used by an end-user of the node.

3. The node of claim 1, wherein after obtaining the utilization data from the peripheral device, the method further comprises:
storing the utilization data in a peripheral entry in a peripheral database.

4. The node of claim 3, wherein the peripheral entry comprises a peripheral device identifier associated with the peripheral device.

5. The node of claim 4, wherein sending the utilization data to the remote authentication server, comprises:
sending the peripheral database.

6. The node of claim 4, wherein sending the utilization data to the remote authentication server, comprises:
sending the peripheral entry.

7. The node of claim 1, wherein the method for metering the usage of the peripheral device further comprises:
receiving a peripheral access message from the remote authentication server, wherein the peripheral access message comprises constraint data associated with the peripheral device; and
in response to receiving the peripheral access message:
updating a peripheral entry, in a peripheral database, to include the constraint data, wherein the peripheral entry comprises a peripheral device identifier associated with the peripheral device.

8. The node of claim 7, wherein the method for metering the usage of the peripheral device further comprises:
sending a control command to the open peripheral port to limit access to the peripheral device.

9. A method for metering usage of a peripheral device by a first operating system, the method comprising:
obtaining, in response to sending a request to the peripheral device and by a system control processor, utilization data from the peripheral device via an open peripheral port connected to the peripheral device,
wherein the utilization data specifies a period of time the peripheral device is used, a number of operations performed on the peripheral device, and a monetary rental cost of the peripheral device; and
sending the utilization data to a remote authentication server,
wherein the first operating system cannot access the system control processor.

10. The method of claim 9, wherein after obtaining the utilization data from the peripheral device, the method further comprises:
storing the utilization data in a peripheral entry in a peripheral database.

11. The method of claim 10, wherein the peripheral entry comprises a peripheral device identifier associated with the peripheral device.

12. The method of claim 11, wherein sending the utilization data to the remote authentication server, comprises:
sending the peripheral database.

13. The method of claim 11, wherein sending the utilization data to the remote authentication server, comprises:
sending the peripheral entry.

14. The method of claim 9, wherein the method for metering the usage of the peripheral device further comprises:
receiving a peripheral access message from the remote authentication server, wherein the peripheral access message comprises constraint data associated with the peripheral device; and
in response to receiving the peripheral access message:
updating a peripheral entry, in a peripheral database, to include the constraint data, wherein the peripheral entry comprises a peripheral device identifier associated with the peripheral device.

15. The method of claim 14, wherein the method for metering the usage of the peripheral device further comprises:
- sending a control command to the open peripheral port to limit access to the peripheral device.

16. A non-transitory computer readable medium comprising instructions which, when executed by a system control processor, enables the system control processor to perform a method for metering usage of a peripheral device by a first operating system, the method comprising:
- obtaining, in response to sending a request to the peripheral device, utilization data from the peripheral device via an open peripheral port connected to the peripheral device,
    - wherein the utilization data specifies a period of time the peripheral device is used, a number of operations performed on the peripheral device, and a monetary rental cost of the peripheral device; and
- sending the utilization data to a remote authentication server,
    - wherein the first operating system cannot access the system control processor.

17. The non-transitory computer readable medium of claim 16, wherein after obtaining the utilization data from the peripheral device, the method further comprises:
- storing the utilization data in a peripheral entry in a peripheral database.

18. The non-transitory computer readable medium of claim 17, wherein the peripheral entry comprises a peripheral device identifier associated with the peripheral device.

19. The non-transitory computer readable medium of claim 16, wherein the method for metering the usage of the peripheral device further comprises:
- receiving a peripheral access message from the remote authentication server, wherein the peripheral access message comprises constraint data associated with the peripheral device; and
- in response to receiving the peripheral access message:
    - updating a peripheral entry, in a peripheral database, to include the constraint data, wherein the peripheral entry comprises a peripheral device identifier associated with the peripheral device.

20. The non-transitory computer readable medium of claim 19, wherein the method for metering the usage of the peripheral device further comprises:
- sending a control command to the open peripheral port to limit access to the peripheral device.

* * * * *